United States Patent
Fujiwara et al.

[11] Patent Number: 5,938,797
[45] Date of Patent: *Aug. 17, 1999

[54] LOW IMPEDANCE SOLID ELECTROLYTIC CAPACITOR AND METHOD FOR FABRICATING THE SAME

[75] Inventors: Masaki Fujiwara; Takasi Kono; Kenichi Omatsu, all of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/917,546

[22] Filed: Aug. 26, 1997

Related U.S. Application Data

[63] Continuation of application No. 08/663,610, Jun. 14, 1996, abandoned, which is a continuation of application No. 08/270,315, Jul. 5, 1994, abandoned.

[30] Foreign Application Priority Data

Jul. 5, 1993 [JP] Japan ..................................... 5-165638

[51] Int. Cl.$^6$ ...................................................... H01G 7/00
[52] U.S. Cl. ........................ 29/25.03; 29/25.41; 361/525
[58] Field of Search ...................................... 361/272, 273, 361/508, 509, 523–529, 530–533, 305, 311, 312, 313, 320, 321.1, 321.2, 321.3, 321.4, 321.5, 322; 29/25.03, 25.41

[56] References Cited

U.S. PATENT DOCUMENTS

| 4,017,773 | 4/1977 | Cheseldine | 361/532 |
| 5,036,434 | 7/1991 | Kobayashi | 361/540 |

FOREIGN PATENT DOCUMENTS 4-273424  9/1992  Japan.

*Primary Examiner*—Leo P. Picard
*Assistant Examiner*—Phuong T. Vu
*Attorney, Agent, or Firm*—Young & Thompson

[57] ABSTRACT

A method of forming a solid electrolytic capacitor which has an anode body, with an anode body lead being set therein, formed of a valve-action metal, and sequentially provided thereon are a dielectric oxide layer, a manganese dioxide layer as a first semiconductor oxide layer, a manganese dioxide layer containing graphite particles as a second semiconductor oxide layer, a graphite layer, and a metal layer either in a silver paste layer or a nickel plated layer. The manganese dioxide layer containing graphite particles possesses characteristics as in both the semiconductor oxide layer and the graphite layer so that the interface resistance and the impedance are reduced and there is no development of cracks and separations which may otherwise develop in the interface between the semiconductor oxide layer and the graphite layer caused by high temperature, high humidity and high pressure.

1 Claim, 4 Drawing Sheets

FIG. IA
PRIOR ART
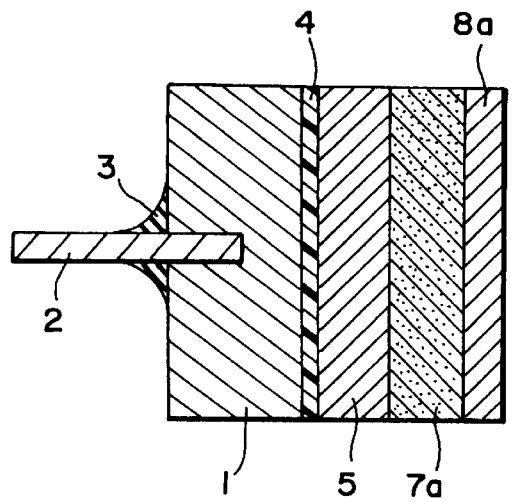
FIG. IB
PRIOR ART
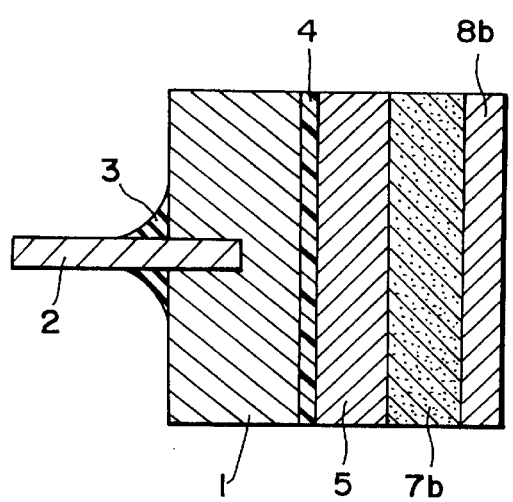
FIG. 2A
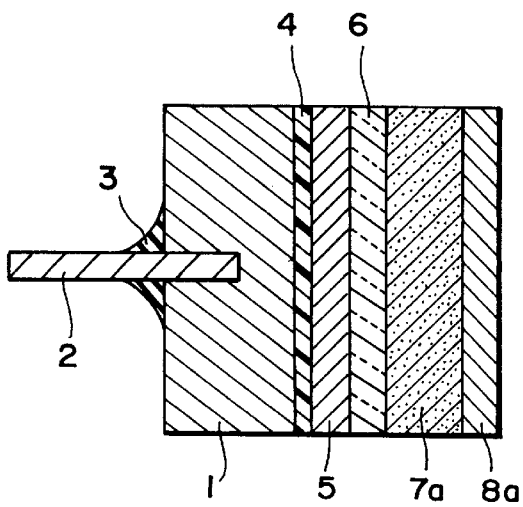
FIG. 2B
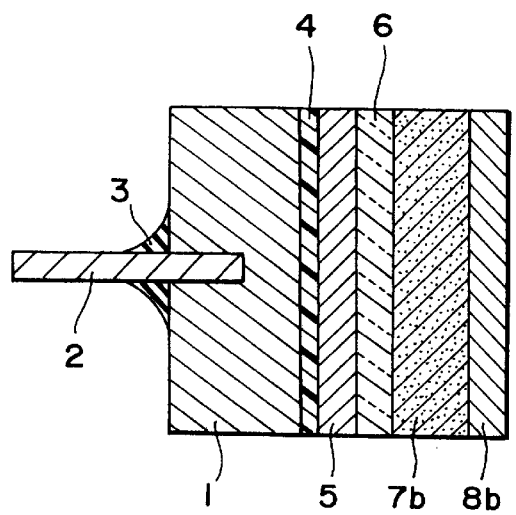

LOW IMPEDANCE SOLID ELECTROLYTIC CAPACITOR AND METHOD FOR FABRICATING THE SAME

This application is a continuation of application Ser. No. 08/663,610, filed Jun. 14, 1996, which is a continuation of Ser. No. 08/270,315, filed Jul. 5, 1994, both now abandoned.

BACKGROUND OF THE INVENTION

1. Field of the Invention

The present invention relates to a solid electrolytic capacitor, and more particularly to a cathode lead-out structure of the solid electrolytic capacitor and a method for fabricating the same.

2. Description of the Related Art

A conventional solid electrolytic capacitor of the kind to which the present invention relates is shown in FIG. 1A. In fabricating such capacitor, particles of valve-action metal such as tantalum and aluminum are pressure-molded into an anode body 1, in which an anode body lead 2 of valve-action metal is set and which is sintered in vacuum. A dielectric oxide coat layer 4 is formed on an outer peripheral surface of the anode body 1 by way of an oxidation process of the anode body. Then, a semiconductor oxide layer 5 of such as manganese dioxide is formed as an opposing electrode of the capacitor on an outer peripheral surface of the dielectric oxide coat layer 4, a graphite layer 7a for reducing contact resistance is formed on the semiconductor oxide layer 5, and a silver paste layer 8a is formed on the graphite layer 7a to complete the fabrication of the capacitor. A combination of the respective cathode layers, i.e., the semiconductor oxide layer 5, graphite layer 7a and silver paste layer 8a forms a combined cathode electrode of the capacitor.

The capacitor element fabricated as above suffers from such problems that, since strength of mechanical contact between the respective cathode layers is weak, the electrical conductivity deteriorates due to the development of cracks and separations caused by such conditions as high temperature, high humidity and high pressure, and accordingly the dielectric loss and the impedance are increased. As for suppressing the deterioration of the electric conductivity, Japanese Patent Application Kokoku Publication No. Hei 2-11009 discloses a fabrication method in which, as shown in FIG. 1B, the element formed up to the semiconductor oxide layer 5 using the same material and the same fabrication steps as those used in FIG. 1A is dipped in graphite paste into which particles of palladium are mixed, followed by a drying process thereby forming a palladium-containing graphite layer 7b. Then, non-electrolytic plating is provided on the palladium-containing graphite layer 7b thereby forming a non-electrolytic nickel plated layer 8b.

As already pointed out, the capacitor element fabricated as above suffers from problems such that, when used under high temperature, high humidity and high pressure conditions, there develop cracks and separations between the respective cathode layers, especially in the interface between the semiconductor oxide layer and the graphite layer, resulting in the deterioration of electrical conductivity and in the increase in the dielectric loss and the impedance.

Also, there is a further problem that the migration of metal or graphite particles into cracked or separated portions results in an increase in leakage currents.

SUMMARY OF THE INVENTION

An object of the invention, therefore, is to overcome the problems existing in the prior art and to provide an improved solid electrolytic capacitor in which the mechanical contact between the respective cathode layers is strengthened and it is ensured that there is no development of cracks and separations caused by high temperature, high humidity and high pressure.

According to one aspect of the invention, there is provided a solid electrolytic capacitor comprising:

an anode body, with an anode body lead being set in one surface of the anode body, formed of a valve-action metal;

a dielectric oxide layer provided on the other surface of the anode body;

a first semiconductor oxide layer provided on the dielectric oxide layer;

a second semiconductor oxide layer containing graphite particles therein, provided on the first semiconductor oxide layer;

a graphite layer provided on the second semiconductor oxide layer; and a metal layer provided on the graphite layer, the first and second semiconductor oxide layers, the graphite layer and the metal layer forming a layered cathode electrode of the electrolytic capacitor.

According to another object of the invention, there is also provided a method for fabricating a solid electrolytic capacitor, the method comprising the steps of;

forming an node body in one surface of which an anode body lead is set and which is formed of a valve-action metal;

forming a dielectric oxide layer on the other surface of the anode body;

forming a first semiconductor oxide layer on the dielectric oxide layer;

forming a second semiconductor oxide layer having graphite particles therein, on the first semiconductor oxide layer;

forming a graphite layer on the second semiconductor oxide layer; and forming a metal layer on the graphite layer.

According to the invention, since the second semiconductor oxide layer containing graphite particles is interposed between the first semiconductor oxide layer and the graphite layer, 1) the semiconductor oxide layer containing graphite particles and the graphite layer form an interlocking rugged surface at their interface so that, due to the anchor effect produced thereby, the cracks or separations which may otherwise develop in the interface between the semiconductor oxide layer and the graphite layer caused by the conditions such as high temperature, high humidity and high pressure can effectively be prevented. Thus, the problem associated to the deterioration of tan δ is solved, and 2) the semiconductor oxide layer containing graphite particles therein possesses characteristics common to both the semiconductor oxide layer and the graphite layer, and this enables the reduction of the interface resistance and the impedance by approximately half that of the prior art capacitors.

BRIEF DESCRIPTION OF THE DRAWINGS

The above and other objects, features and advantages of the present invention will be apparent from the following description of preferred embodiments of the invention explained with reference to the accompanying drawings, in which:

FIG. 1A is a diagrammatic sectional view of a first prior art solid electrolytic capacitor element;

FIG. 1B is a diagrammatic sectional view of a second prior art solid electrolytic capacitor element;

FIG. 2A is a diagrammatic sectional view of a solid electrolytic capacitor element of a first embodiment according to the invention;

FIG. 2B is a diagrammatic sectional view of a solid electrolytic capacitor element of a second embodiment according to the invention;

PREFERRED EMBODIMENTS OF THE INVENTION

Figure 3:
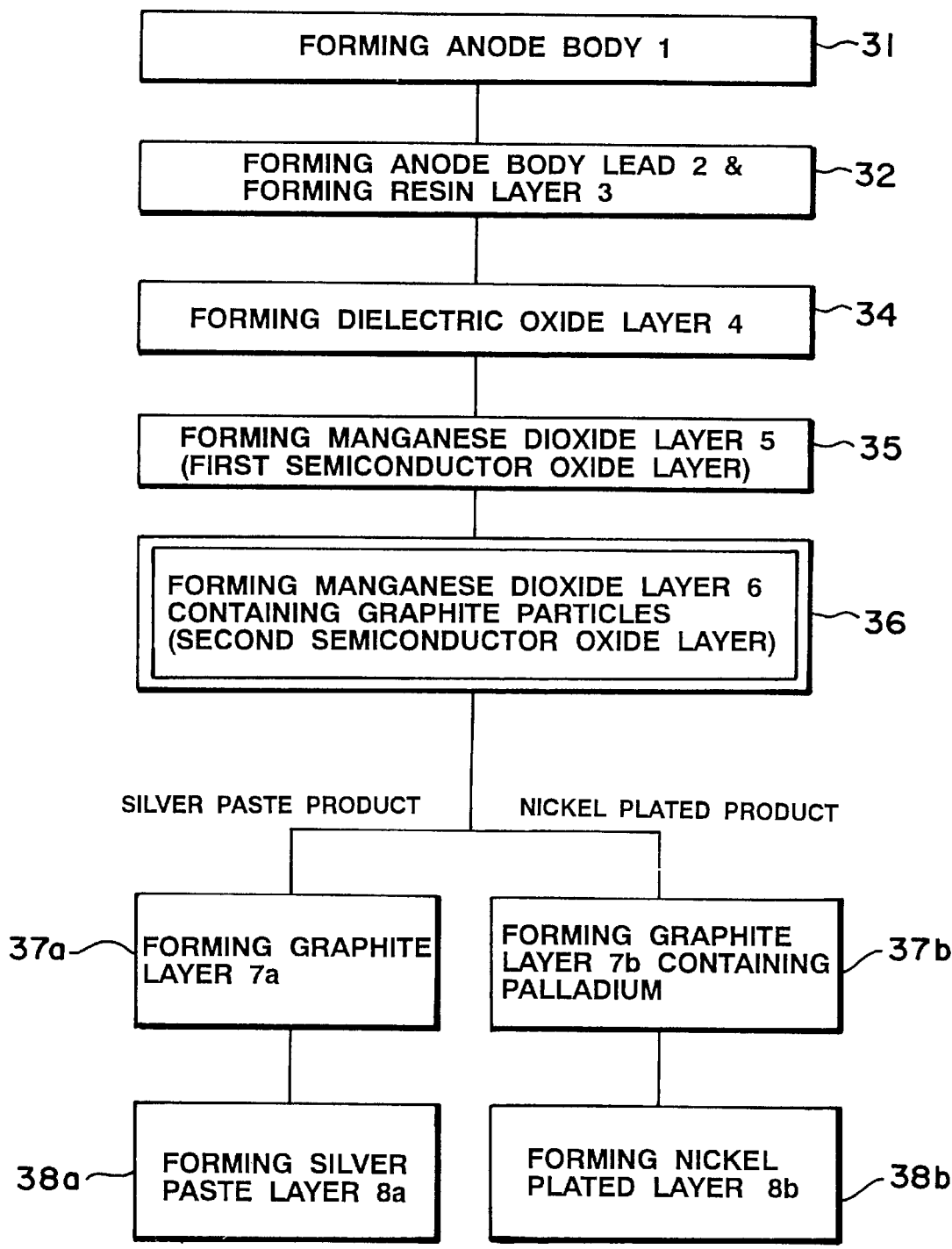
FIG. 3 is a flow chart showing the sequential fabrication steps in fabricating the solid electrolytic capacitor elements of the first and second embodiments according to the invention.

Now, with reference to the accompanying drawings, preferred embodiments of the invention are explained in comparison with the prior art.

FIG. 2A shows, in a diagrammatic sectional view, an element structure of a solid electrolytic capacitor of a first embodiment according to the invention.

As seen in FIG. 2A, an anode body lead 2 is set in an anode body 1 which is formed by pressure-molding particles of tantalum, which is one of valve-action metals, and is subjected to the vacuum sintering. A resin layer 3 is formed on the surface in which the anode body lead 2 is set. Then, a dielectric oxide layer 4 and a manganese dioxide layer 5 which constitutes a semiconductor oxide layer are formed by way of an oxidation process of the anode body. Subsequently, on an outer side of the manganese dioxide layer 5, there is formed a manganese dioxide layer 6 containing graphite particles, which constitutes one of the features of the invention. Thereafter, a graphite layer 7a and a silver paste layer 8a are sequentially formed using the same steps as in the prior art method, and this completes the fabrication of the solid electrolytic capacitor element of this embodiment according to the invention.

FIG. 2B shows, in a diagrammatic sectional view, an element structure of a solid electrolytic capacitor of a second embodiment according to the invention. The element up to the manganese dioxide layer 6 containing graphite particles is formed using the same material and the same fabrication steps as those in the first embodiment. The element is then dipped in graphite paste containing palladium particles followed by a drying process, thereby forming a graphite layer 7b containing palladium. Non-electrolytic plating is then provided on the graphite layer 7b containing palladium thereby forming a non-electrolytic nickel plated layer 8b, and this completes the fabrication of the solid electrolytic capacitor element of the second embodiment according to the invention.

Now, further details of the fabrication methods for the above two embodiments are explained with reference to FIG. 3 which is a flow chart of the steps for fabricating the solid electrolytic capacitors according to the invention. The respective steps up to the formation of the manganese dioxide layer 5 are the same as those in the prior art method, which cover the steps of forming the anode body 1 (STEP 31), setting-in the anode body lead 2 and forming the resin layer 3 (STEP 32), forming the dielectric oxide layer 4 (STEP 34), and forming the manganese dioxide layer 5 (STEP 35). The element thus formed is dipped in a mixed liquid in which graphite particles are suspended in manganese nitrate solution, which is then thermally decomposed in an atmosphere with the temperature being 200–250° C. whereby a manganese dioxide layer 6 containing graphite particles therein (the film thickness being 1 μm–5 μm) is formed on the manganese dioxide layer 5 (STEP 36). The mixed liquid mentioned above is one in which the manganese nitrate solution 70% (within a range 95% ~ 50%) and the graphite particles 30% (within 5% ~ 50%) respectively by weight percentage are mixed and diluted in organic solvent. The graphite particles used in the mixed liquid are in average particle size of about 1 μm (within a range 0.1 ~ 10 μm).

Here, further steps are divided into two for the respective embodiments. First, in the first embodiment according to the invention, the element having the manganese dioxide layer 6 containing the graphite particles is dipped in the solution in which graphite particles are suspended, followed by the drying process in an atmosphere with the temperature of 150–200° C., whereby the graphite layer 7a is formed (STEP 37a). The average size of the graphite particles used in the graphite layer 7a is substantially the same as the particle size of the graphite particles used in the manganese dioxide layer 6 containing the graphite particles. Then, the element is dipped in the silver paste in which the silver particles, epoxy resin, and curing agent are mixed and diluted in butyl acetate, followed by the drying and thermal curing processes in the atmosphere of 150–200° C., whereby a silver paste layer 8a is formed (STEP 38a). This completes the fabrication of the solid electrolytic capacitor element of the first embodiment according to the invention.

Next, in the second embodiment according to the invention, the element up to the manganese dioxide layer 6 containing graphite particles is formed using the same material and the same fabrication steps (STEPs 31 through 36) as those in the first embodiment. The element is then dipped in the solution in which graphite particles and palladium particles are suspended, followed by the thermal curing process in the atmosphere of 150–200° C., thereby forming a graphite layer 7b containing palladium (STEP 37b). On the graphite layer 7b containing palladium, there is applied non-electrolytic nickel plating using non-electrolytic nickel plating liquid with, for example, dimethylaminoborane as reducing agent, thereby forming a non-electrolytic nickel plated layer 8b (STEP 38b). This completes the fabrication of the solid electrolytic capacitor element of the second embodiment according to the invention.

Now, the performance characteristics of the solid electrolytic capacitors according to the invention are explained. From each group of the capacitors fabricated according to the methods of the above two embodiments of the invention and the two prior art methods, 20 specimens are arbitrarily taken out and then subjected to a pressure cooker test (capacitors are left without any load being applied thereto for 100 hours in an atmosphere of 120° C. and 2 atm).

Figure 4A:
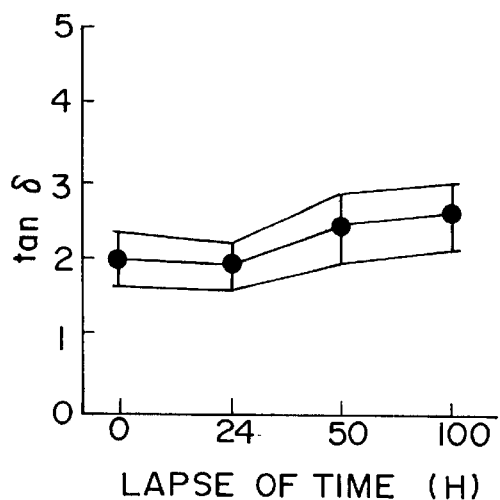
FIG. 4A is a diagram showing changes of tan δ measured by subjecting the capacitor element of the first embodiment according to the invention to a pressure cooker test.
Figure 4B:
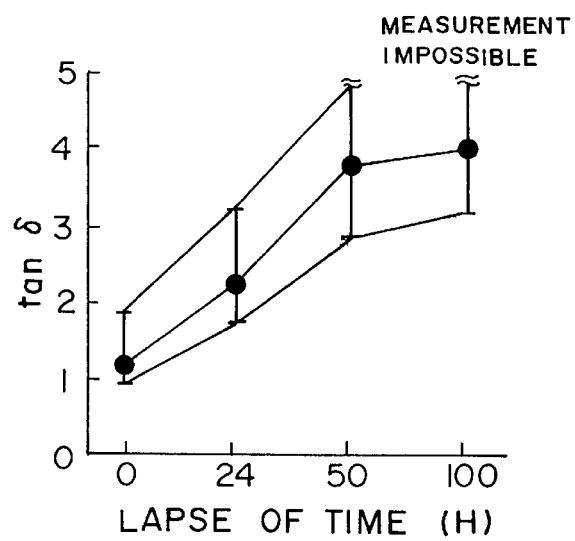
FIG. 4B is a diagram showing changes of tan δ measured by subjecting the capacitor element of the first prior art capacitor element to the pressure cooker test.

FIGS. 4A and 4B show changes of tan δ (measured at frequency of 120 Hz) respectively of the capacitors of the first embodiment according to the invention and of the capacitors of the first prior art (both being the silver paste products). It is noted that, as shown in FIG. 4B, tan δ of the capacitors of the first prior art is markedly deteriorated and the measurement is impossible for some of them after the lapse of 50 hours. On the other hand, with respect to the capacitors of the first embodiment according to the invention, an increase in tan δ even after the lapse of 100 hours is very slight, which indicates that the deterioration with a lapse of time is small.

Figure 5A:
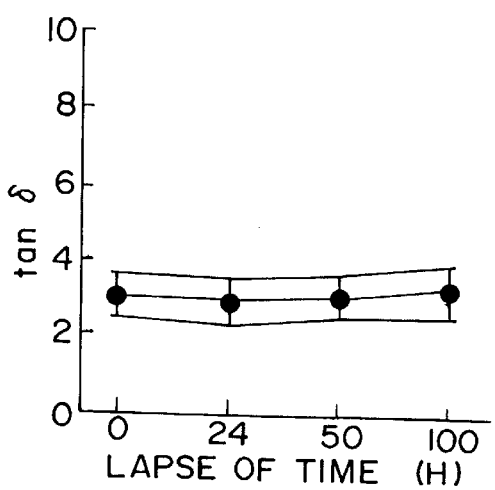
FIG. 5A is a diagram showing changes of tan δ measured by subjecting the capacitor element of the second embodiment according to the invention to the pressure cooker test.
Figure 5B:
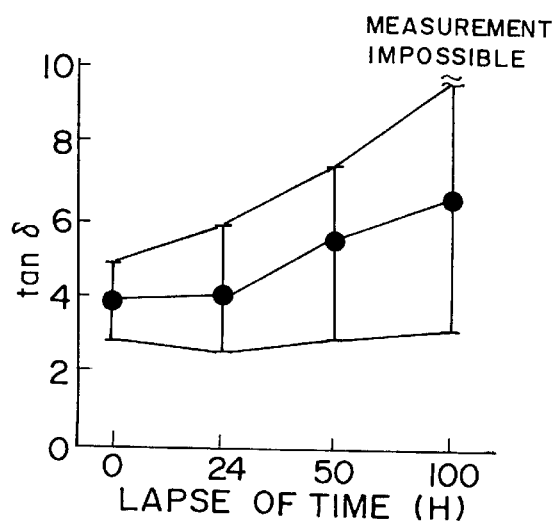
FIG. 5B is a diagram showing changes of tan δ measured by subjecting the capacitor element of the second prior art capacitor element to the pressure cooker test.

FIGS. 5A and 5B show changes of tan δ (measured at frequency of 120 Hz) respectively of the capacitors of the second embodiment according to the invention and of the capacitors of the second prior art (both being the nickel plated products) when subjected to the pressure cooker test. It is noted that an increase in tan δ of the capacitors of the second embodiment according to the invention as compared with that of the second prior art is very small and the deterioration with a lapse of time is also small.

Figure 6:
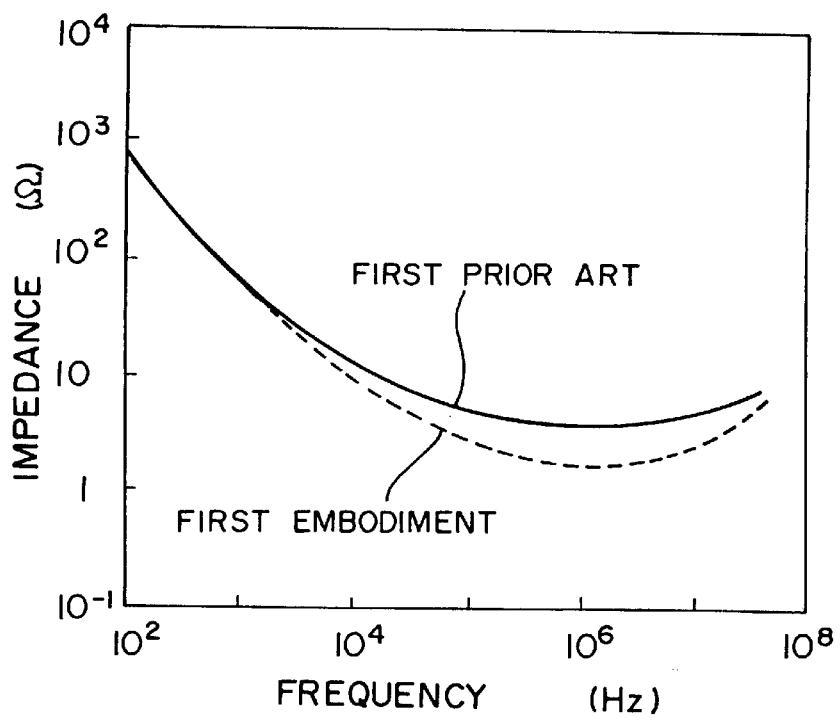
FIG. 6 is a diagram showing impedance-frequency characteristics of the capacitor element of the first embodiment according to the invention in comparison with those of the first prior art capacitor element.
Figure 7:
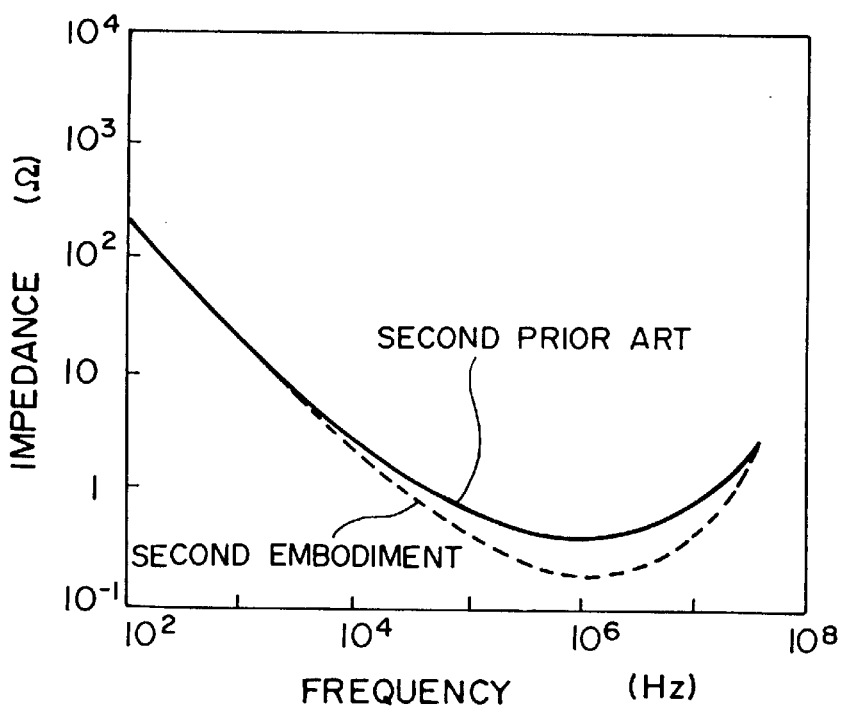
FIG. 7 is a diagram showing impedance-frequency characteristics of the capacitor element of the second embodiment according to the invention in comparison with those of the second prior art capacitor element.

The manganese dioxide layer 6 containing the graphite particles possesses characteristics of both the manganese dioxide layer 5 and the graphite layer 7a, 7b with a result that the interface resistance is reduced and so the impedance is reduced. FIG. 6 shows impedance-frequency characteristics of the capacitors respectively of the first embodiment according to the invention and of the first prior art (both being the silver paste products). FIG. 7 shows impedance-frequency characteristics of the capacitors respectively of the second embodiment according to the invention and of the second prior art (both being the nickel plated products). With the solid electrolytic capacitors according to the invention having the manganese dioxide layer 6 containing the graphite particles, the minimum impedance (appearing at approximately $10^6$ Hz (=10 MHz)) is less than half as compared with that in the prior art solid electrolytic capacitor.

In the exemplified embodiments of the invention, tantalum has been used for the anode body, but it is of course possible to use other valve-action metals, such as niobium, titanium and aluminum.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A method for fabricating a solid electrolytic capacitor, said method comprising the steps of:

forming an anode body in one surface of which an anode body lead is set and which is formed of a valve-action metal;

forming a dielectric oxide layer on the other surface of said anode body;

forming a first semiconductor oxide layer on said dielectric oxide layer;

forming a second semiconductor oxide layer having graphite particles therein, on said first semiconductor oxide layer, by dipping the capacitor formed so far into a manganese nitrate solution having graphite particles suspended therein and thermally decomposing the capacitor with the solution thereon at a temperature of 200° to 250° C. to form the second semiconductor oxide layer with graphite particles therein on the first semiconductor layer;

forming a graphite layer on said second semiconductor oxide layer; and forming a metal layer on said graphite layer.

\* \* \* \* \*